Dec. 6, 1966  E. H. BUSH  3,290,064
CABLE COUPLING SHIELD
Filed Aug. 8, 1963
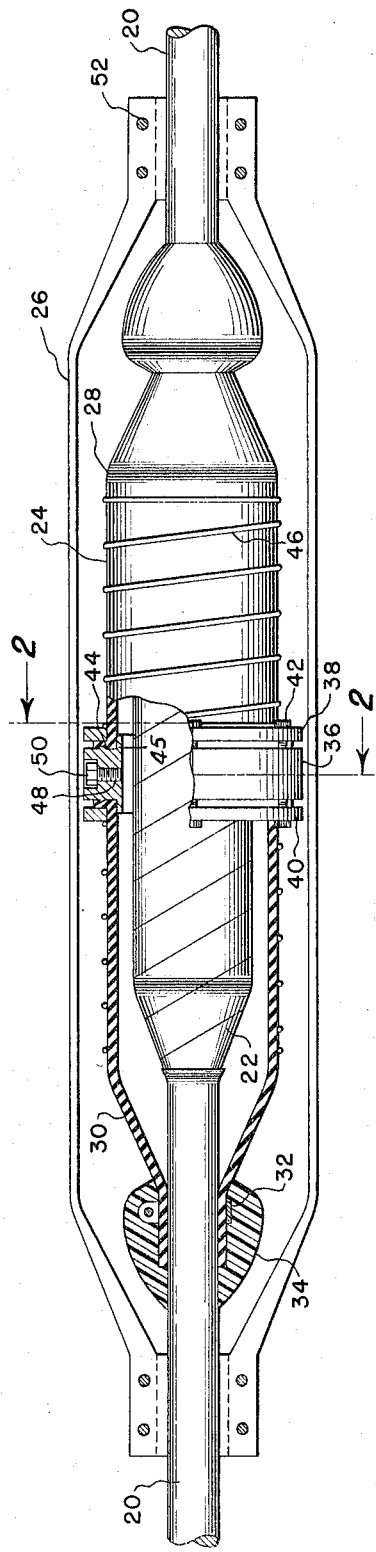
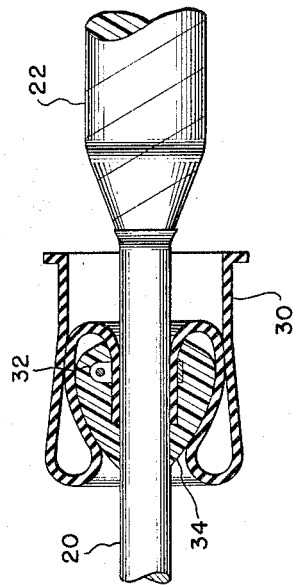
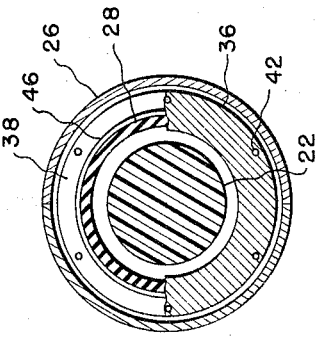
INVENTOR.
EDWIN H. BUSH
BY
*Fulwider, Patton, Rieber, Lee and Utecht*  ATTORNEYS

3,290,064
CABLE COUPLING SHIELD
Edwin H. Bush, 770 Hamilton St., El Centro, Calif.
Filed Aug. 8, 1963, Ser. No. 300,827
1 Claim. (Cl. 285—45)

The present invention relates to an airtight, flexible cable coupling shield.

The current practice of using a rigid cable coupling shield has proved to be unsatisfactory. Rigid metallic shields fail due to fatigue which is caused by the cyclic strain which coupling shields are subjected to. Cyclic strain may be produced by forces due to wind, earth movement, or cable expansion and contraction. The flexible cable shield disclosed in this application will not fail from fatigue.

In many fields of cable coupling, it is important to keep the interior of the shield and thus the coupling, free from undesirable agents such as oxygen. Undesirable agents are frequently kept out of the shield by maintaining the shield under a positive internal inert gas pressure. Therefore, in such cases, shield failure results in loss of internal pressure which then results in the ingression of undesirable agents.

The cable coupling shield as herein disclosed has the further advantage of permitting easy access to the cable coupling. The rubber sleeve, as hereafter described, may be easily peeled back to bare the cable coupling, since in pressurized cable systems, it is desirable to periodically test the system for leaks. The cable coupling shield is herein described as means for testing the system gas pressure.

Other features and advantages of the present invention will be apparent from the following description, reference being made to the accompanying drawing wherein a preferred embodiment of the invention is illustrated.

In the drawing:

FIG. 1 is a front view of the invention with the front half of the strain shell removed;

FIG. 2 is a sectional view taken along line 2—2 of FIG. 1; and

FIG. 3 is a fragmentary sectional view of the flexible sleeve of the invention, peeled back to expose the coupling.

Referring more in detail to the drawing, in FIG. 1 is shown the cable 20, the cable coupling 22, the flexible cable coupling shield 24 and the strain shell 26.

The flexible cable coupling shield 24 is comprised of two flexible airtight covering sleeves 28 and 30 which are clamped to cable 20 by clamping means 32 and which are sealed to the cable 20 by sealing means 34. The sealing means, being comprised of plastic adhesive tape which is wrapped around the ends of the sleeves 28 and 30 which are clamped to the cable 20, the clamps 32, and the cable 20.

The adjacent ends of the sleeves 28 and 30 are each secured to the test hub 36 by sealing rings 38 and 40. Threaded screws 42 secure the sealing rings to the test hub and provide tightening means for increasing the forces holding the ends of the sleeves 28 and 30 between the test hub and the sealing rings. The continuous ridges 44 and lips 45 help to prevent the ends of the sleeves from slipping out from between the sealing rings and the test hub.

Springs 46 are provided to prevent the sleeves 28 and 30 from ballooning when subject to internal gas pressure.

Threaded hole 48 and its mating thread plug 50 are provided to permit the determination of the gas pressure level or the rate of decrease in gas pressure level of the cable system. A system leak being indicated by a decreasing pressure level.

Strain shell 26 is provided to protect the cable coupling from adverse agents such as rocks in the case of underground use. The strain shell 26 is comprised of two identical pieces which are held together by thread screws 52.

FIG. 2 is a sectional view to clarify the construction of the test hub 36 and the sealing rings 38 and 40.

If inspection of the coupling 22 is desired, one of the sealing rings 38 or 40 is removed, one of the springs 46 is removed, and one of the flexible sleeves 28 or 30 is peeled back to expose the coupling 22. FIG. 3 shows sleeve 30 peeled back.

Thus, it is apparent from the foregoing description that I have invented a flexible cable coupling shield that will not structurally fail from fatigue and which provides for easy access to the coupling which is encompasses.

While the form of embodiment herein shown and described, constitutes preferred form, it is to be understood that other forms may be adopted falling within the scope of the claim that follows.

I claim:

An airtight, flexible cable coupling shield, comprising in combination:

(A) a two piece flexible covering sleeve made of an air impervious material, each piece having substantially the same cross-sectional shape, and having a radially extending flange on one end;

(B) joining means for joining together the flanged ends of the sleeves, said joining means comprising:
  (1) an element having:
    (a) a hole which is axially aligned with the sleeve, and has substantially the same cross-sectional shape as the transverse cross-sectional shaped defined by the sleeve;
    (b) two side surfaces which are engagable with said flanges;
    (c) continuous ridge means disposed on each of said side surfaces;
    (d) two lips, each lip being adjacent said hole, one of said lips extending laterally from each of said side surfaces such that each lip extends into a sleeve when said flanges engage said side surfaces;
  (2) pressing means for pressing each of said flanges against said side surfaces and said ridge means, said pressing means comprising two surfaces, each one of said latter surfaces being contiguous with the outer surface of a sleeve and opposing one of said lips;

(C) clamping means for clamping the opposite ends of the sleeve to the cable;

(D) sealing means for sealing said opposite sleeve ends to the cable, said sealing means effectuating an airtight seal between the sleeve ends and the cable prohibiting the ingress or egress of fluid into or from the interior of the shield.

(References on following page)

References Cited by the Examiner

UNITED STATES PATENTS

| | | | |
|---|---|---|---|
| 2,016,905 | 10/1935 | Nathan | 285—45 |
| 2,313,169 | 3/1943 | Penick | 285—93 X |
| 2,496,154 | 1/1950 | Fermier | 285—93 |
| 2,574,655 | 11/1951 | Panofsky | 285—239 |
| 2,978,533 | 4/1961 | Colbert | 285—45 |
| 3,039,795 | 6/1962 | Reuter | 285—235 |
| 3,079,459 | 2/1963 | Abbott | 174—91 |

FOREIGN PATENTS

| | | |
|---|---|---|
| 114,384 | 12/1941 | Australia. |
| 211,655 | 5/1956 | Australia. |
| 602,547 | 5/1935 | Germany. |
| 526,694 | 3/1955 | Italy. |

CARL W. TOMLIN, *Primary Examiner.*

R. A. GIANGIORGI, *Assistant Examiner.*

UNITED STATES PATENT OFFICE
CERTIFICATE OF CORRECTION

Patent No. 3,290,064 December 6, 1966

Edwin H. Bush

It is hereby certified that error appears in the above numbered patent requiring correction and that the said Letters Patent should read as corrected below.

Column 2, line 21, for "is" read -- it --; line 39, for "shaped" read -- shape --.

Signed and sealed this 19th day of September 1967.

(SEAL)
Attest:

ERNEST W. SWIDER
Attesting Officer

EDWARD J. BRENNI
Commissioner of Patent